C. R. DAY.
FRICTION DRIVE.
APPLICATION FILED MAR. 12, 1914.
1,128,111.
Patented Feb. 9, 1915.
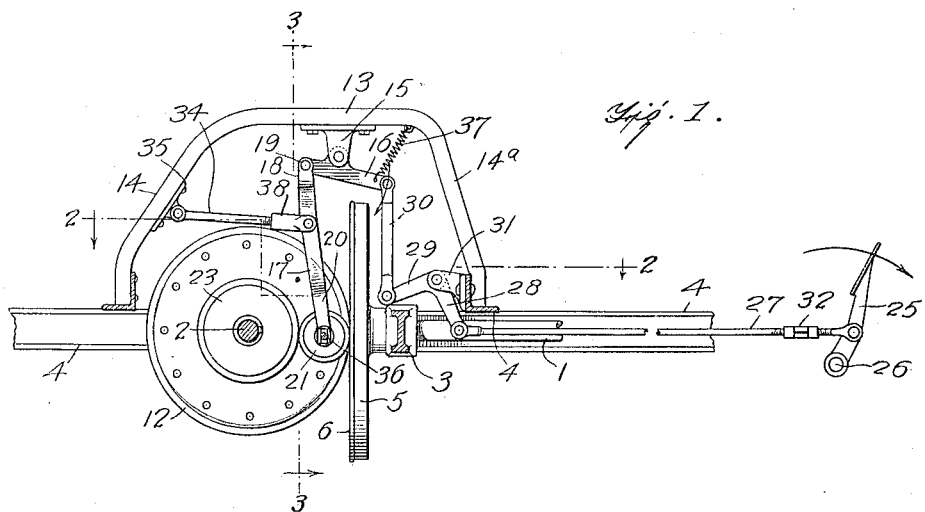
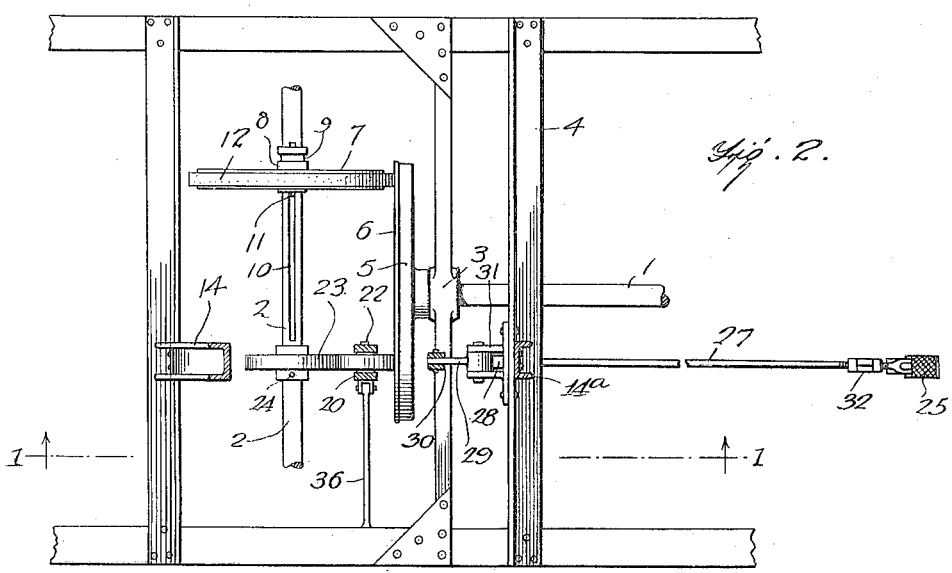
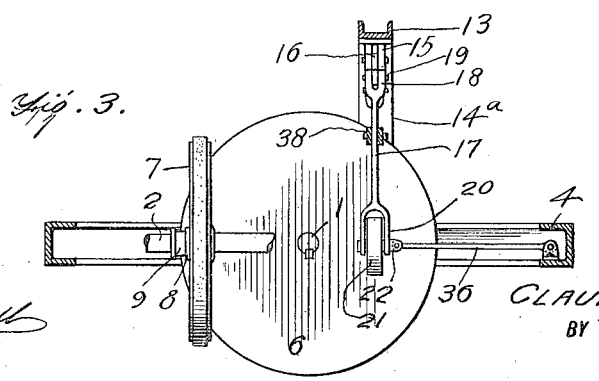
WITNESSES
INVENTOR
CLAUDE R. DAY,
BY Munn & Co.
ATTORNEYS

UNITED STATES PATENT OFFICE.

CLAUDE R. DAY, OF ARTHUR, WEST VIRGINIA.

FRICTION-DRIVE.

1,128,111. Specification of Letters Patent. Patented Feb. 9, 1915.

Application filed March 12, 1914. Serial No. 824,116.

*To all whom it may concern:*

Be it known that I, CLAUDE R. DAY, a citizen of the United States, and a resident of Arthur, in the county of Grant and State of West Virginia, have made certain new and useful Improvements in Friction-Drives, of which the following is a specification.

My invention is an improvement in friction drives, and has for its object to provide a drive of the character specified, adapted for use with automobiles and like vehicles, wherein auxiliary mechanism is provided in connection with the usual variable connection between the driving shaft and the driven shaft, for permitting the driver at will to connect the driving shaft and the driven shaft while the relative speed between the shafts is being varied.

In the drawings; Figure 1 is a section on the line 1—1 of Fig. 2, and Figs. 2 and 3 are sections on the lines 2—2 and 3—3 respectively, of Fig. 1, all of the views looking in the direction of the arrows adjacent to the said lines.

The present embodiment of the invention is shown in connection with a drive shaft 1 and a driven shaft 2, the drive shaft being journaled in bearings 3 in the frame 4 of an automobile or like vehicles, and the drive shaft is provided at the end adjacent to the driven shaft with a friction disk 5, the said disk having a facing 6 of suitable material having a high coefficient of friction. The driven shaft is also supported by the frame 4 in any usual or desired manner, and the friction disk 7 is mounted to slide longitudinally of the said shaft, the hub 8 of the disk having an annular groove 9 for receiving the operating mechanism to move the disk. The shaft 2 is provided with a longitudinally extending groove 10, and a feather 11 is arranged within the hub for engaging the groove, to permit the disk to move longitudinally of the shaft, while forcing the shaft to rotate with the disk.

The disk 7 is provided with a facing 12 of some material having a high coefficient of friction, and the said facing engages the facing 6 of the disk 5, to constrain the driven shaft to rotate with the drive shaft. The relative speed of the driven shaft with respect to the drive shaft is varied by moving the disk 7 radially of the said disk. When the disk 7 engages the disk 5 near its center, the shaft 2 will be driven at a relative low speed with respect to the driving shaft 1, while when the disk 7 engages the disk 5 near its periphery the relative speed of the shaft 2 will be increased.

A substantially arch or U-shaped bracket comprising a body 13 and arms 14 and 14a extends above the frame 4, the ends of the bracket being secured to the frame, as shown. The said bracket is preferably of channel material, as shown, for the sake of strength, and the bracket is arranged at the opposite side of the disk 5 from the disk 7.

A bearing bracket 15 depends from the body 13 of the U-shaped bracket near its center, and a rock lever 16 is pivoted intermediate its ends to the said bearing bracket. A link 17 is provided at its upper end with a fork, and the arms 18 of the fork extend on opposite sides of the adjacent end of the rock lever 16, and are pivoted to the said ends by means of the pin or bolt 19.

The lower end of the lever is also forked, and the arms 20 of the fork extend on opposite sides of a wheel 21, and the wheel is journaled between the arms by means of a bolt and nut 22. The wheel 21 is provided with a facing of material having a high coefficient of friction on its peripheral surface, and the said wheel is adapted to engage at one side the face of the disk 5 at the side remote from the engagement of the disk 7, and at the other side with the periphery of a wheel 23 secured to the driven shaft 2, as indicated at 24.

The wheel 23 is of greater diameter than the wheel 21, and said wheel 21 is adapted to be moved into and out of position to connect the wheel 23 with the disk 5, by means of the treadle lever 25. The said lever is arranged in position for operation by the foot of the driver, and is mounted to swing on a shaft or rod 26. A rod 27 connects the treadle lever with one of the arms 28 of an elbow lever, the other arm 29 of the said lever being connected to the opposite end of the rock lever 16 from the link 17 by means of the link 30.

The rock lever is pivoted at the junction of its arms to a bearing bracket 31 supported by the frame 4, and a turn buckle 32 is interposed in the length of the said rod 27 to permit the length of the rod to be varied. It will be evident that when the treadle is moved in the direction of the arrow shown in Fig. 1, the elbow lever 28—29 will be rocked in a direction to move the forward end of the rock lever 16 downward, and to raise the rear end. The raising of the rear end of the said rock lever will move the wheel 21 into a position to connect the disk 5 with the wheel 23, that is to connect the driving shaft 1 with the driven shaft 2. When the rock lever 16 is operated in the opposite direction, the wheel 21 will be lowered, and means is provided for swinging the said wheel out of contact with the wheel 23 and the face of the wheel 5 when it is so lowered. The said mechanism comprises an internally threaded socket 38 pivoted to the link 17 intermediate its ends, and near its connection with the lever 16.

A rod 34 has one of its ends threaded and engaged with the socket 38, and the other end is pivoted to a bearing 35 secured to the arm 14 of the U-shaped bracket. It will be evident that when the wheel 21 is raised as above mentioned, the said wheel will be moved toward the disk 5 by means of the connection 34—38 between the link and the arm 14 of the U-shaped bracket. On the other hand when the rock lever 16 is operated to lower the wheel 21, the said connection 34—38 will swing the lower end of the link 17 toward the shaft 2, holding the wheel 21 out of engagement with the wheel 23, and moving it out of engagement with the face of the disk 5.

With the usual construction of transmission connection between the driving shaft and the driven shaft, when the driver wishes to change speed, as for instance in hill climbing, when it is desired to change from high to low speed, it is necessary to disconnect the motor from the wheels in order to make the change. During this disconnection, the car will lose a large amount of momentum, thus slowing the speed if it does not stop.

The present improvement is designed to cure this defect by providing auxiliary and independent mechanism for connecting the driving shaft and the driven shaft without disturbing the connection already existing. The change in the relative speed of the driving and the driven shaft in the present arrangement, is made by shifting the disk 7 longitudinally of the shaft 2, to cause the periphery thereof to engage the face of the disk 5 nearer to or farther away from the shaft 1.

With the present arrangement, when traveling on the high speed, and for any reason it is desired to change to the low speed, the treadle 25 is operated to swing the elbow 28—29 in a direction to raise the wheel 21, to cause it to connect the disk 5 with the wheel 23. This contact may be held until the friction disk has been shifted to the desired position. As soon as the shift has been made, the treadle lever 25 is released, and the weight of the wheel 21 and connected parts in coöperation with the spring 37 will move it downwardly out of engagement with the disk 5. Since the contact between the disks 5 and 7, as also the contact between the disk 5 and the wheels 21 and 23 is frictional, there can be no breakage, even were both connections made at the same time. The parts will merely slip upon each other.

It will be noted that the wheel 21 is much smaller than the wheel 23, and that the said wheels are just beyond the center of the disk 5, at the opposite side from the disk 7. The wheel 21 engages the disk 5 as near the center as possible, but in such manner as to leave room for the disk 7 to be moved into the reverse position, whereby the disk can be moved beyond the shaft 1 to engage the disk 5 on the opposite side of the shaft 1 from its position in Fig. 2.

A coil spring 37 is arranged between the end of the rock lever 16 connected with the arched bracket and the bracket, for normally constraining the rock lever to move in a direction to lower the wheel 21, that is to move the said wheel into inoperative position. A rod 36 is pivoted at one end to one of the arms 20 of the fork on the lower end of the link 17, and the other end of the rod is pivoted to the frame 4. The rod 36 is of a length such that when the wheel 21 is in operative position the wheel will be held in register with the wheel 23 while when the wheel 21 is lowered, the wheel will be swung slightly toward the connected end of the rod.

It is obvious that the rod could be arranged to cause the wheel to move in the same plane, that is to prevent any lateral movement if desired. Such lateral movement, however, is very slight and may be neglected. The spring 37 returns the connection to inoperative position, when the treadle lever is released.

I claim:—

1. The combination with the driving shaft, the driven shaft, a friction disk on the driving shaft, and a friction disk on the driven shaft movable longitudinally thereof and engaging with its periphery the adjacent face of the first-named disk and movable radially with respect to the said first-named disk to vary the relative speed of the shafts, of a wheel on the driven shaft and secured thereto, a rock lever, mounted for rocking movement above the shafts, a link pivoted at one end to one end of the rock lever, the lower end of the link being forked, a drive wheel journaled between the arms of the fork and of a diameter to connect the first-named wheel with the adjacent face of the first-named disk, a bracket for supporting the rock lever, a treadle lever for engagement by the foot of the operator, a connection between the treadle lever and the other end of the rock lever for swinging the said rock lever, a turn buckle interposed in the said connection, and means connected with the link for holding the drive wheel supported thereby in engagement with the wheel of the driven shaft when the link is raised.

2. The combination with the driving shaft, the driven shaft, a friction disk on the driving shaft, and a friction disk on the driven shaft movable longitudinally thereof and engaging with its periphery the adjacent face of the first-named disk and movable radially with respect to the said first-named disk to vary the relative speed of the shafts, of a wheel on the driven shaft and secured thereto, a rock lever mounted for rocking movement above the shafts, a link pivoted at one end to one end of the rock lever, the lower end of the link being forked, a drive wheel journaled between the arms of the fork and of a diameter to connect the first-named wheel with the adjacent face of the first-named disk, means in connection with the link for swinging the lower end of the link away from the first-named disk when the link is in lowermost position, and means connected with the other end of the rock lever for rocking the said lever.

3. The combination with the driving shaft, the driven shaft, a friction disk on the driving shaft, and a friction disk on the driven shaft movable longitudinally thereof and engaging with its periphery the adjacent face of the first-named disk and movable radially with respect to the said first-named disk to vary the relative speed of the shafts, of a wheel on the driven shaft and secured thereto, a rock lever mounted for rocking movement above the shafts, a link pivoted at one end to one end of the rock lever, the lower end of the link being forked, a drive wheel journaled between the arms of the fork and of a diameter to connect the first-named wheel with the adjacent face of the first-named disk, and means connected with the other end of the rock lever for rocking the said lever.

4. The combination with the driving shaft, the driven shaft, a friction disk on the driving shaft, and a friction disk on the driven shaft movable longitudinally thereof and engaging with its periphery the adjacent face of the first-named disk and movable radially with respect to the said first-named disk to vary the relative speed of the shafts, of a wheel on the driven shaft and secured thereto, a rock lever mounted for rocking movement above the shafts, a driving wheel supported by one end of the rock lever and adapted to connect the last-named wheel with the adjacent face of the first-named disk when the said driving wheel is between the wheel and the disk, and means connected with the other end of the rock lever for swinging the same to raise and lower the driving wheel.

5. The combination with the driving shaft, the driven shaft, a friction disk on the driving shaft, and a friction disk on the driven shaft movable longitudinally thereof and engaging with its periphery the adjacent face of the first-named disk and movable radially with respect to the said first-named disk to vary the relative speed of the shafts, of auxiliary means for connecting the driven shaft to the first-named disk and normally in inoperative position, and means for moving the said auxiliary means into operative position, said auxiliary means comprising a wheel on the driven shaft, and a driving wheel adapted to engage between the periphery of the said wheel and the adjacent face of the first-named disk.

CLAUDE R. DAY.

Witnesses:
 EDITH E. DAY,
 MADGE L. DAY.

Copies of this patent may be obtained for five cents each, by addressing the "Commissioner of Patents, Washington, D. C."